March 21, 1967 T. MACK 3,310,122
CHAIN HARROWS
Filed June 19, 1964 2 Sheets-Sheet 1

TONY MACK
BY Douglas S. Johnson
Att'y

March 21, 1967 — T. MACK — 3,310,122
CHAIN HARROWS
Filed June 19, 1964 — 2 Sheets-Sheet 2
FIG. 2
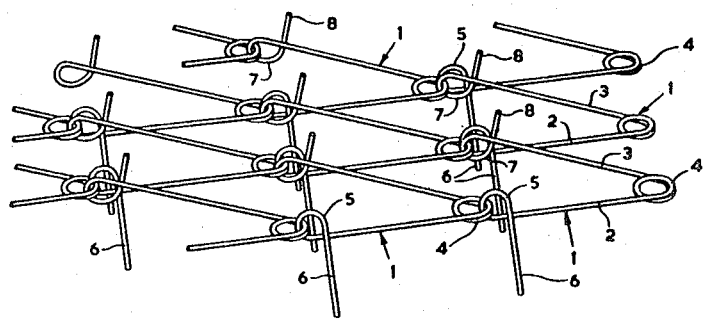
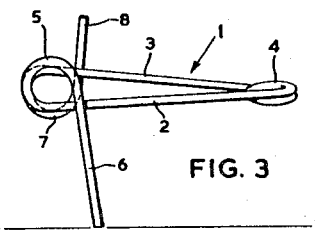
FIG. 3
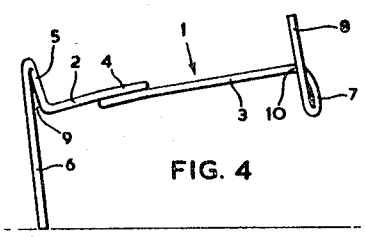
FIG. 4
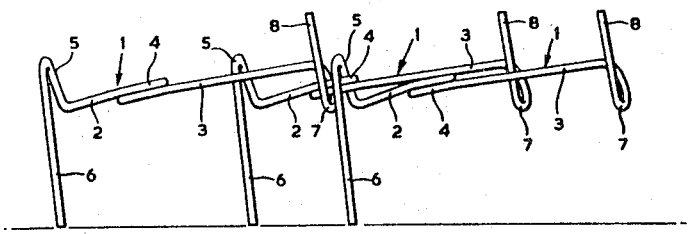
FIG. 5
TONY MACK
BY
Douglas S. Johnson
Atty

# United States Patent Office 3,310,122
Patented Mar. 21, 1967

3,310,122
CHAIN HARROWS
Tony Mack, Lake Wilcox, Ontario, Canada, assignor to General Steel Wares Limited, Toronto, Ontario, Canada
Filed June 19, 1964, Ser. No. 378,092
6 Claims. (Cl. 172—34)

This invention relates to a chain harrow.

A principal object of the invention is to provide a chain harrow that shakes off clods that tend to clog it.

Another object is to provide a chain harrow that is light in weight and does not require added weight to operate satisfactorily.

Another object is to provide a chain harrow that can be operated in different manners to perform different tasks.

The invention is illustrated by way of example in the accompanying drawings in which a preferred form of harrow is shown and in which:

FIG. 2 is a perspective view of several units of the harrow of FIG. 1;

FIG. 3 is a side view of one of the units;

FIG. 4 is a front view of the unit of FIG. 3; and

FIG. 5 is a front view of three of the units connected together.

Figure 1:
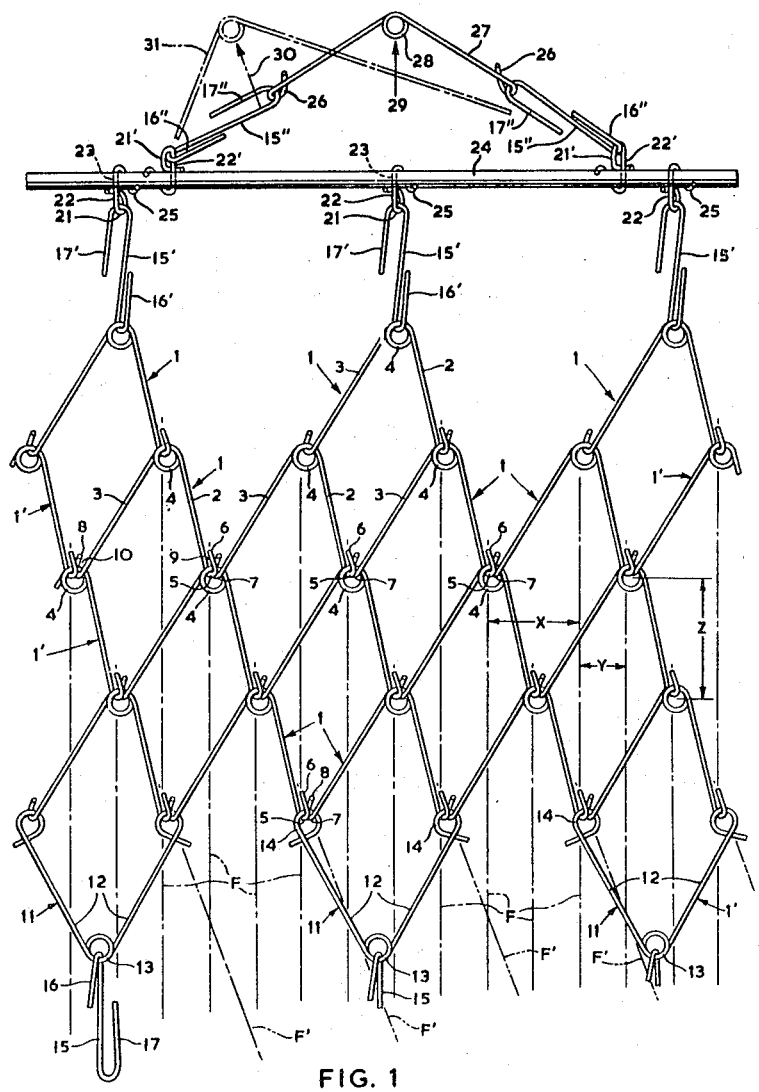
FIG. 1 is a plan view of a harrow, showing in broken lines an alternative connection for the front of the harrow to change the direction of towing.

The harrow shown in the drawings consists of a plurality of strong resilient steel rods each bent to form a generally V-shaped unit 1 when viewed in plan. The unit normally travels with the apex of the V leading, and thus the arms 2 and 3 of the V may be considered as diverging rearwardly. These generally horizontal arms 2 and 3 of the V are of unequal lengths, arm 2 being a little over three-quarters the length of arm 3. The angle between the arms 2 and 3 is about 46°. At the apex of the V is a generally horizontal loop 4 formed by bending the rod through approximately 494°, or a little more than one and one third complete turns. The shorter arm 2 has at its end a generally vertical loop 5 formed by bending the end of the rod upwardly and then forwardly and downwardly at the outside of the arm 2 through a little less than three-quarters of a complete turn, the end of the rod forming a downwardly extending tine 6. The longer arm has at its end a generally vertical loop 7 formed by bending the end of the rod downwardly and then forwardly and upwardly at the outside of the arm 3 through a little less than three-quarters of a complete turn, this end of the rod forming an upwardly extending tine 8.

The tine 6 clears the arm 2 at 9 by an amount sufficient to enable the vertical loop 5 to be linked with a horizontal loop 4 of a following unit 1, and similarly the tine 8 clears the arm at 10 by an amount sufficient to enable the vertical loop 7 to be linked with a horizontal loop 4 of a following unit. Thus the units 1 can be linked together to form a net supported by the downwardly extending tines 6, these tines 6 constituting the means for furrowing the earth as the harrow is towed over the earth. Each unit 1 has but one supporting tine 6. The loops 4, 5 and 7 are sufficiently large that they are loosely linked, and thus the units 1 are swingably articulated to one another.

At the sides of the harrow are incomplete units 1' each having one of its arms cut off near its loop 4. At the rear of the harrow are V-shaped units 11 the arms 12 of which are of equal length and diverge forwardly from loops 13 that normally trail in the dirt. The ends of the arms 12 have loops 14 that link with loops 5 and 7 of units 1. Trailing from the loops 13 are rods 15 each having a hook 16 at one end linked with a loop 13 and also having a hook 17 at its opposite end for a purpose that will be explained below.

The leading units 1 of the harrow have their loops 4 linked to rear hooks 16' of rods 15' similar to the rods 15. Front hooks 17' of the rods 15' are linked to loops 21 of rods 22 that pass at 23 through an elongated towing member 24, the rods 22 being bent at 25 around the member 24 to secure them to the member. A pair of further rods 22' similar to the rods 22 are also secured to the member 24 and have loops 21' linked to rear hooks 16" of a pair of rods 15" similar to the rods 15 and 15'. Front hooks 17" of the rods 15" are linked to rear hooks 26 of a V-shaped unit 27. An apex loop 28 of the unit 27 can be connected to a towing attachment of a tractor. The distances from the loop 28 to the two loops 21' are equal and the towing member 24 normally is at right angles to the direction, indicated by the arrow 29 in which the tractor travels. The downwardly extending tines 6 are in parallel lines also at right angles to the direction of travel. However a tine 6 in one of such lines is not directly behind or directly in front of a tine 6 in the adjacent line of tines 6; rather the tines of each parallel line are staggered laterally with respect to the tines of adjacent parallel lines. In the arrangement shown, a tine 6 in the front line is directly ahead of a tine three lines behind it (in the rearmost line), and the harrow makes three parallel furrows (indicated by broken lines F) in the area or strip traversed by a typical unit 1, all the furrows produced by the harrow being equally spaced apart. The arm 3 of each unit 1 traverses a strip twice as wide as the arm 2, the arm 2 making an angle of approximately 14° with the direction of travel whereas the arm 3 makes an angle of approximately 32°. The tines 6, on which most of the weight of the harrow is carried, extend downwardly and somewhat forwardly from the loops 5 (FIG. 3), and it is found that when the harrow is towed forwardly in the direction of the arrow 29 these tines 6 dig into the earth, the depth to which they dig increasing as the speed of towing increases. This digging action appears to be caused by having each unit supported by only one tine 6, with the unit off balance with respect to its supporting tine. Although the harrow is of comparatively light weight, this tendency of the tines 6 to dig in makes it unnecessary to place weights on top of the harrow to obtain satisfactory operation.

As already mentioned, the forward loops 4 of the units 1 each exceed a complete turn, and this makes possible considerable vibration of the lengths 2 and 3 of the units. Also the loose couplings between units at the loops 4, 5 and 7 facilitate wobbling, shaking and vibration as the harrow is towed. The resultant vibratory motion of the units shakes loose clods of earth that might otherwise tend to clog the harrow. Any clogging that does occur can usually be eliminated by suddenly increasing the towing speed. The vibratory motion also tends to work the tines 6 from side to side as they dig their furrows. Because each unit 1 has only a single downwardly extending tine and is swingably articulated to the other units, the harrow does not tend to pick up stones or other foreign material. The swingable couplings between the units 1 also enable the harrow to flex and accommodate itself to uneven ground, as well as to ride over submerged rocks or other immovable objects without damage. It will be seen from FIG. 5 that the tines 6 are at a small angle to the vertical when viewed from the front of the harrow, and thus they have some tendency to turn the furrowed earth upwardly.

If it is desired to increase the distance between furrows, in order for example to cultivate between rows of small plants, the harrow can be towed in the direction indicated by the broken arrow 30 (FIG. 1), so that each tine 6 follows along the furrow F' of the nearest tine 6 ahead of it. Towing in the direction of the arrow 30 is achieved by using a towing rod 31. The tines 6 are found to dig into the earth more rapidly when the harrow is pulled in the direction of the arrow 30 than when it is pulled in the direction of the arrow 29.

Another manner of operating the harrow is to disconnect the hooks 17' from the loops 21 and move the member 24 to the rear of the harrow where the hooks 17 can be linked with the loops 21. Then the harrow can be towed in the direction opposite to that of the arrow 29, and it is found that the tines 6 do not tend to dig so deeply into the earth. Each tine 6, when viewed from the front of the harrow, is inclined downwardly and inwardly toward the underside of its unit, and as the harrow is pulled in the direction of the arrow 29 earth pressure against the end of the tine tends to contract the loop 5 and close the gap 9, rather than to open and deform the loop. This arrangement is useful where the operator wishes more of a brushing action than a digging action of the tines, as for example in breaking stubble.

The harrow can be operated in another manner by inverting it so that most of its weight is carried by the shorter tines 8. When pulled in the direction of the arrow 29 this arrangement is useful to cover seed and to work soft earth, in which the harrow is not to dig too deeply. With the tines 8 down the harrow can also be drawn in the direction opposite to that of the arrow 29 to level a field and work in manure.

The steel rods of the harrow are preferably coated with aluminum paint to inhibit rusting. In a typical construction, the distance $x$ (FIG. 1) is eight inches, the distance $y$ is four inches, the distance $z$ is ten and one-quarter inches, the rods are of seven-sixteenths inch diameter stock, the loops 4, 5 and 7 of one and one-half inch inside diameter, the tines 6 extending downwardly from the arms 2 about five inches and the tines 8 extending upwardly from the arms 3 about two inches..

For the purposes of illustration the harrow shown in FIG. 1 has been drawn with the tines in four parallel lines at right angles to the normal direction of travel 29. In an actual harrow it is preferred to have about nine such lines of tines so that each furrow is worked by three tines, and it is also preferred to make the harrow wider, by increasing the number of units 1, so that the harrow will traverse a wider area. A harrow twice as wide as the one illustrated and twice as long can be handled by one man. The rods 15' form swingable links between the elongated towing member 24 and the apex loops 4 of most forward (or leading) units 1, and the apex loops 4 of the following units provide swingable articulations in lines parallel to the member 24. This arrangement makes it possible to use the member 24 as a core around which the net formed by the harrow can be wrapped when the harrow is not in use. So wrapped, a large harrow can be carried by two men, each lifting one end of the member 24.

What I claim as my invention is:

1. A harrow comprising a plurality of substantially identical strong resilient metal rods, each bent into a generally horizontal V with a horizontal loop turned through greater than 360° at the apex of said V and a pair of arms having unequal lengths diverging from said apex; a first of said pair of arms having at the rear thereof a generally vertical loop turned through less than 360° and forming a downwardly extending tine, said tine being a single supporting tine for each of said rods; the second of said pair of arms having at the rear thereof a generally vertical loop turned through less than 360° and forming an upwardly extending tine; the tine formed in the shorter of said pair of arms being longer than the tine formed in the longer of said pair of arms; said rods being swingably articulated to one another by loose engagement of the loops formed in the ends of said arms of forward rods in the apex loops of following rods to form a net supported by said supporting tines; the tines formed in said arms of each of said rods extending slightly forwardly of the generally vertical loops from which they depend, each tine extending at a small angle from the vertical towards the other arm of said pair of arms from which the tine depends, when viewed from the front of said harrow; and towing means for towing said net, with which towing means the apices of the leading rods are swingably linked.

2. A harrow as claimed in claim 1 wherein said towing means comprises an elongated member.

3. A harrow as claimed in claim 2 wherein the V of each rod is divisible, by a line normal to said elongated member, into unequal angles, the smaller of which is made with the shorter arm; and wherein said supporting tines are arranged in lines parallel to said elongated member with the tines of each parallel line staggered with respect to the tines of other parallel lines.

4. A harrow as claimed in claim 3 wherein the angle of said generally horizontal V is about 46°.

5. A harrow as claimed in claim 4 wherein said smaller angle made with said shorter arm is about 14°.

6. A harrow as claimed in claim 5 wherein the shorter arm is about three-quarters the length of the longer arm.

References Cited by the Examiner

UNITED STATES PATENTS

| | | | |
|---|---|---|---|
| 1,385,861 | 7/1921 | Comrie | 172—612 X |

FOREIGN PATENTS

| | | |
|---|---|---|
| 163,080 | 5/1949 | Austria. |
| 768,916 | 8/1934 | France. |
| 789,696 | 11/1935 | France. |
| 141,012 | 2/1902 | Germany. |
| 619,214 | 9/1935 | Germany. |
| 1,730 | 1896 | Great Britain. |
| 939,226 | 10/1963 | Great Britain. |
| 38,895 | 8/1936 | Holland. |

ABRAHAM G. STONE, *Primary Examiner.*

JOE O. BOLT, Jr., *Examiner.*

J. R. OAKS, *Assistant Examiner.*